United States Patent [19]

Dawson

[11] 4,445,836
[45] May 1, 1984

[54] INTEGRATED PROCESS FOR PREPARING A CONTINUOUS STRING OF MOLDED ARTICLES WOUND IN A COIL

[75] Inventor: C. Bruce Dawson, Winchester, Va.

[73] Assignee: O'Sullivan Corporation, Winchester, Va.

[21] Appl. No.: 316,033

[22] Filed: Oct. 28, 1981

[51] Int. Cl.³ .......................... B29D 5/00; B29F 1/14
[52] U.S. Cl. .................................... 425/135; 264/167; 425/436 R; 425/441; 425/545; 425/556; 425/588; 425/DIG. 5
[58] Field of Search ................ 264/167, 297; 242/153, 242/154, 155 R; 425/DIG. 34, 139, 443, 545, 135, 441, 436 R, 556, 588, DIG. 5

[56] References Cited

U.S. PATENT DOCUMENTS

| | | | |
|---|---|---|---|
| 2,569,083 | 9/1951 | Wilhelm | 264/328.9 |
| 2,578,123 | 12/1951 | Bendfelt | 242/155 R |
| 2,686,338 | 8/1954 | Morin | 425/545 |
| 2,829,402 | 4/1958 | Morin | 264/297 |
| 2,965,932 | 12/1960 | Knowles | 264/297 |
| 3,192,298 | 6/1965 | Fisher | 264/294 |
| 3,364,293 | 1/1968 | Culpin | 264/167 |
| 3,526,368 | 9/1970 | Sanders | 242/155 R |
| 4,008,302 | 2/1977 | Erlichman | 264/156 |
| 4,226,577 | 10/1980 | Sawada | 425/545 |

FOREIGN PATENT DOCUMENTS

524149  4/1956  Canada ................................. 242/153

Primary Examiner—James B. Lowe
Attorney, Agent, or Firm—Burns, Doane, Swecker and Mathis

[57] ABSTRACT

Provided is a method and apparatus for molding and winding in a continuous operation a string of molded items. The molded items of the string or chain are molded in spaced relationship to one another and are connected by molded scrap connectors. The string of molded items is then advanced until only a trailing connector of the last molded item extends into the mold cavity. Upon subsequent molding operation, therefore, the subsequent molded item is molded integral with the existing string of molded items. The continuous string of molded items is kept under constant tension and wound periodically into a coil. The molding, advancing, tensioning and winding operations are all integrated and synchronized in order to provide a wound package which greatly facilitates its use in an automatic assembly operation. The synchronization of the molding, advancing, tensioning and winding operations also provide for an overall smooth and integrated system for forming the wound coils of molded items, which system can be run continuously with little supervision.

1 Claim, 7 Drawing Figures

INTEGRATED PROCESS FOR PREPARING A CONTINUOUS STRING OF MOLDED ARTICLES WOUND IN A COIL

BACKGROUND OF THE INVENTION

1. Field of the Invention

The present invention relates to a method and apparatus for practicing the method of molding a continuous string or chain of interconnected elements or articles connected through molded scrap connectors. More particularly, the present invention relates to an integrated and continuous method, and apparatus therefor, of molding and winding a string of molded items into a tight coil.

2. Description of the Prior Art

Automatic assembly techniques for assembling a plurality of different components into a single composite product are well known. These techniques are employed, for example, in the assembly of anti-theft devices, such as those clamped to a garment in a store and which are capable of setting off an alarm when passed through a suitable sensor, e.g., located at the door of the store.

In the molding of small parts in large quantities for automatic assembly, it is conventional to mold a predetermined number of parts in a single operation of the mold, after which the groups of parts may be handled as a unit by virtue of their being connected together through scrap runners. The handling of such units during automatic assembly is, however, generally very inefficient in that it requires at least one person untangling and/or orienting the units and then feeding the individual units to the automatic assembly system. Any means of facilitating the automatic assembly of different parts, e.g., by making the feeding of parts to the assembly system more automatic and trouble free of entanglement and the need for correctly orienting the units, would be of great value to the industry.

In the molding of small parts, the molding of a continuous string of parts in spaced relationship and connected via scrap runners is known.

For example, U.S. Pat. No. 3,192,298 discloses a process for producing a runner of indefinite length with an indefinite number of molded articles secured thereto. In each successive molding operation of the process, the runner and its connected articles are removed from the mold cavity and are advanced so that only a small portion of the runner remains in the mold cavity to be connected to the runner of the next molding. Thereby, a runner of indefinite length is formed.

U.S. Pat. No. 2,569,083 discloses a method for molding a runner simultaneously with a plurality of articles to form a piece comprising the articles in spaced relation with respect to each other but connected through the medium of the runner. Upon removing the molded piece from the mold cavity, the trailing end of the runner is left in the mold cavity so that the leading end of the runner of the newly molded piece is molded around the trailing end of the preceding piece. Thus, a chain of spaced, molded articles is formed.

In both of the aforediscussed processes, however, a great deal of resin is generally employed in the molding of the runner which is of a substantial structure. The runner is no more than a scrap runner, and thus a great deal of resin is wasted in a sense for non-article molding. As well, when the articles are removed from the runner, a great deal of scrap material has to be dealt with. The continuous string of articles provided by the aforediscussed processes are also in a form which would not facilitate easy shipment to an assembler followed by an automatic assembly of parts.

U.S. Pat. No. 3,655,308 also discloses a process for molding a continuous string of items, but with the items being successive sections of a plastic sheet. The sections are joined together at their edges during the molding process, so that the end product is a continuous plastic sheet.

U.S. Pat. No. 4,008,302 discloses a process for the molding of a succession of identical plastic parts in the form of a continuous web in which the parts are spaced from one another and secured to at least one continuous runner. The runner employed in the process can be any tape-like or other scrap portion employed during molding which is not a component of the molded part or parts, and which is provided to the mold from a continuous extraneous source. By employing a flexible web runner, a continuous chain of molded articles or parts formed by the process may then be wound and stored.

The problem with winding a continuous string of molded articles, however, is that the articles often cause problems during the unwinding due to the coil sagging and the string possibly becoming entangled. Thus, while shipment of the wound spool of articles to the assembler is facilitated, the package in itself does not facilitate the automatic assembly of the parts since the wound package must constantly be monitored due to the problems encountered in unwinding from the sagging of the coil of parts and/or entanglement of the parts. The problems encountered often result in stoppages and delays of the assembly line, and can also get so bad as to require that each part be cut from the coil and again be oriented and fed by hand to the assembly machine.

Thus, there is a definite need in the industry for an efficient and effective integrated process for preparing molded parts to be later assembled via automatic assembly in a form which not only facilitates its handling by the supplier, but which also truly facilitates the automatic assembly of the parts once received by the assembler. While of course a package which would facilitate automatic assembly could be made with much effort and time on the part of the supplier, for the process to be economically practical and commercially viable, it should also offer advantages to the supplier of the molded elements in the sense of an effective and efficient operation.

Accordingly, it is an object of the present invention to provide a most effective and efficient process for preparing a continuous string of molded parts in a form which facilitates its shipment to an assembler as well as the automatic assembly of the parts into a single composite product.

More particularly, it is an object of the present invention to provide an improved and integrated process and apparatus for preparing a wound coil of items, which coil in itself facilitates the automatic assembly of parts by the assembler.

It is another object of the present invention to provide a continuous process which requires little supervision during the preparation of such a wound coil of items as well as the apparatus therefor.

It is another object of the present invention to provide a process and apparatus for molding a continuous string or chain of molded items without necessarily using a substantial amount of resin for scrap runners or connectors.

It is still another object of the present invention to provide a process and apparatus for molding a continuous string of discreet items whereby the advancement of the string and withdrawal of the molded items from the mold are achieved without grabbing and distorting the parts.

These and other objects, as well as the scope, nature and utilization of the invention, will be apparent to those skilled in the art from the following description, accompanying drawings, and the appended claims.

SUMMARY OF THE INVENTION

Consistent with the objects of the present invention, there is provided a continuous and most efficient integrated process for forming a continuous string of molded items which is wound into a coil under tension. The tightly wound coil can be generally unwound without encountering problems due to sagging of the coil and entanglement, and thereby in itself facilitates the automatic assembly of parts by avoiding the need for a person to constantly monitor, assure proper orientation of, and feed individual parts or strips of parts to the assembly machine.

The intergrated process for forming and coiling a continuous string of molded items in accordance with the present invention comprises molding an item in a mold such that the item has an integral trailing connector. Upon conclusion of the molding operation, the string of molded items is then advanced to generally remove the newly molded item from the mold cavity, but with a portion of the trailing connector thereof remaining in the cavity. Thus, upon subsequent molding operation, each subsequent item is molded in connection with the trailing connector of a preceding item, and hence, integral with the string of items.

The existing string of items is maintained under a constant tension by a tensioning device. The tensioned string of items is then periodically wound, under tension, to provide a tightly wound coil. The tensioning, winding, molding and advancing operations are all synchronized to allow for a continuous operation needing little supervision and to insure that the string of molded items are constantly maintained under tension and are wound under tension into the coil.

In a preferred embodiment, the constant tension upon the continuous string of molded items is maintained by a tensioning means which readily takes up the added length created in the continuous string by each advancement of the string subsequent to a molding operation. Thus, the tensioning means is synchronized in the sense that every time the string of molded items is lengthened via an advancement or indexing operation, the tensioning means adjusts to maintain the constant tension on the continuous string.

The winding operation is also integrated and synchronized with the overall system, but need not occur in every sequence with the remaining operations of the process in order to insure a uniform and smooth overall process. Generally, it is preferred that the winding operation be intermittent with regard to the advancing operation, i.e., the winding occurring periodically once after every, e.g., sixth advancing operation. In the meantime, to maintain the constant tension on the continuous string of molded items and to thereby assure a winding of the elements under tension, the tensioning means must be such as to be able to adjust and maintain the constant tension.

In a preferred embodiment of the present invention, the tensioning step comprises feeding the string of items around two guides at the end of a bar in an S-shaped route, with the bar being rotatable about an axis disposed perpendicular to the bar and resiliently biased so that the first guide contacted by the string is urged generally toward the direction of advancement of the string and the second guide subsequently contacted by the string is urged generally away from the direction of advancement.

In another embodiment of the present invention, an apparatus for carrying out the aforediscussed integrated process is provided. The apparatus generally comprises a mold for molding an item such that the item has an integral trailing connector. The item can either be a single article and/or element or a plurality of elements spaced apart and connected in a string by molded connectors.

The apparatus also comprises an indexing means for advancing the string to generally remove the molded item from the mold cavity while a portion of the trailing connector thereof remains in the cavity, so that a subsequently molded item is connected to the trailing connector of a preceding item.

The apparatus further comprises a tensioning means which imposes a constant tension on the continuous string of molded items. In a preferred embodiment, the tensioning means comprises a bar, preferably vertical, with two guides at each end, with the bar being rotatable about an axis disposed perpendicular to the bar. The bar is also resiliently biased so as to keep a constant tension on the string of items and to place any added length resulting from the operation of the advancing means under tension.

The apparatus further comprises a winding or coiling means for periodically winding the continuous string of items into a coil while the constant tension is imposed thereon.

DETAILED DESCRIPTION OF THE INVENTION

Figure 1:
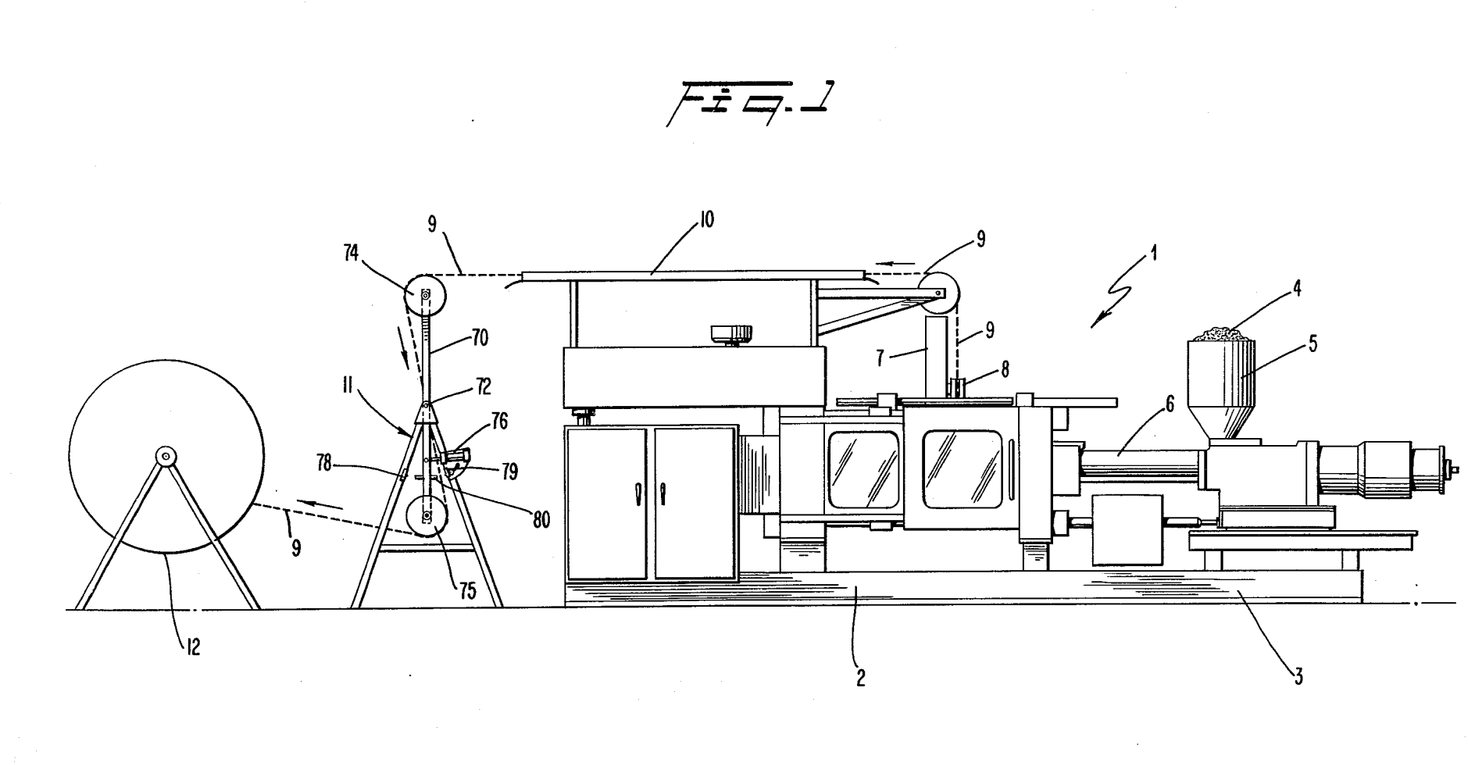
FIG. 1 is a perspective view of the apparatus set-up for the overall integrated process in a preferred embodiment of the present invention.

Referring to FIG. 1, depicted generally as 1 is a commercial injection molding machine, such as that available from Cincinnati Milacron, Van Dorn, HPM or Natco. The molding machine generally comprises a clamp end 2 and an injection end 3. In the conventional manner, resin material 4 is added to the injection end of the machine via hopper 5.

In the general automated and integrated system depicted in FIG. 1, the sequence of steps of practicing the present invention is generally as follows:

The press of the clamp end closes to define the mold cavity into which the molten resin material 4 will be injected. Once the pressure has built up to the desired amount in the injection section 3 of the machine, which pressure can be measured by a suitable means such as a microswitch, injection takes place via passageway 6, which contains an auger screw to fill the mold cavity with the molten resin material. Injection continues until the cavity is filled, which can be measured by, e.g., a transducer in the mold. About this time, an advancing means 8 of indexing mechanism 7, which is at its topmost position, opens its jaws and indexes down until it arrives at its lowermost position, at which time it closes its jaws around the existing strip 9 of molded items. The FIG. 1 shows the advancing means 8 at its lowermost position. The closing of the jaws of the advancing means 8 can be actuated by any suitable means, for example, upon hitting a microswitch when it reaches its lowermost position.

The amount of time appropriate for cooling the injected resin material is then measured, at the conclusion of which the press may be opened. Upon the opening of the press, a conventional ejector mechanism (not shown) is activated and moves forward in order to insure ejection of the molded items from the mold cavities. It is preferred that the indexing mechanism 7 (FIGS. 2 and 3) also move forward with the ejector mechanism in order to assure that the string of articles will hang freely once the ejector retracts. Generally, the ejector and indexing mechanism are moved forward until a forward microswitch is activated causing the ejector to return to its original position but leaving the indexing mechanism forward. This insures that the string of items 9 is hanging freely and thus may be indexed upward without complication.

Figure 2:
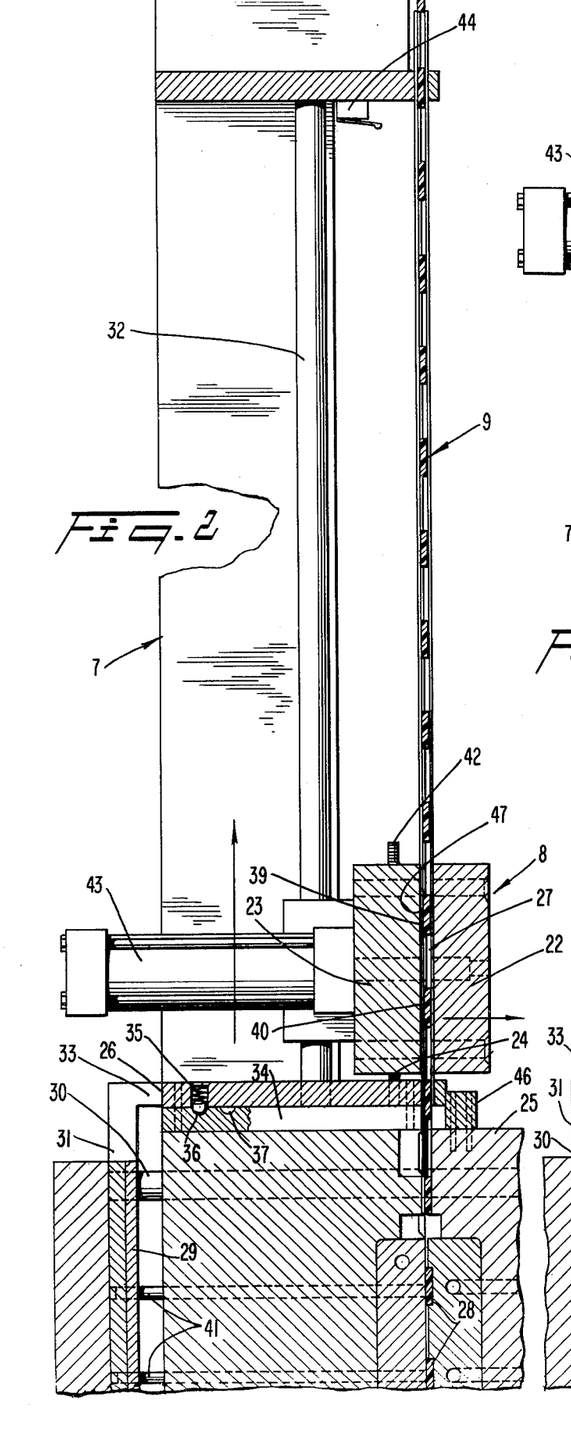
FIG. 2 is a sectional fragmentary view showing the advancing means of the indexing mechanism in its lowermost position.
Figure 3:
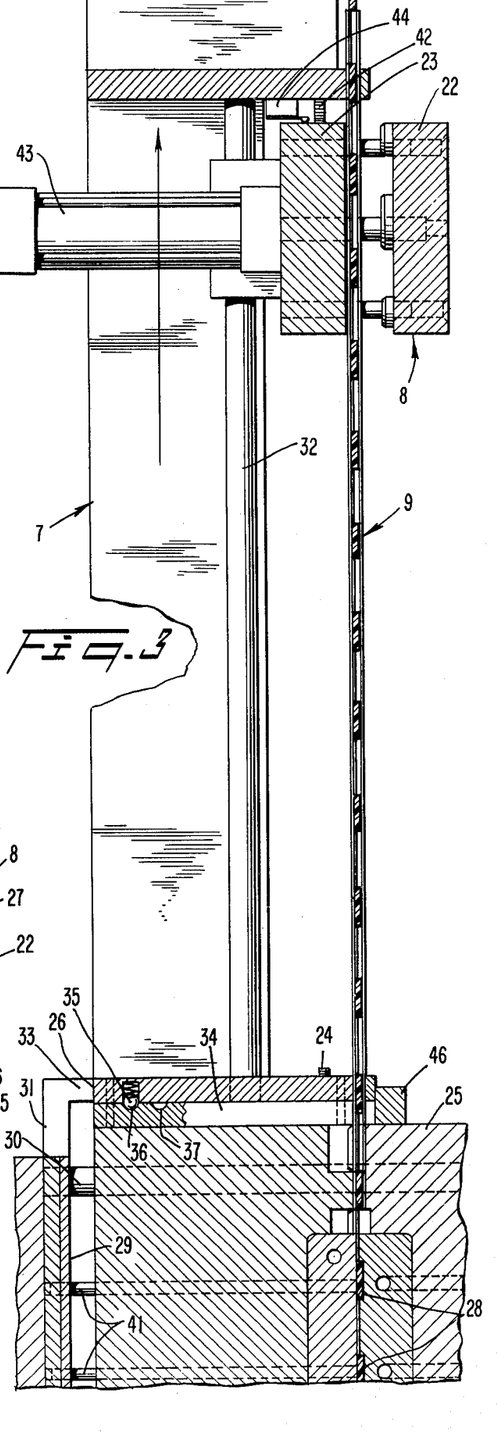
FIG. 3 is a sectional fragmentary view showing the advancing means of the indexing mechanism at its uppermost position.

The advancing means 8 of indexing mechanism 7 then indexes to its uppermost position pulling with it the newly molded item, which has become integral with the already existing string of items 9. As a result of the upward indexing of the advancing means 8, the string of items 9 is advanced the distance the advancing means 8 travels.

The continuous string of items passes through a guide trough 10 (FIG. 1), which fits over the clamp portion 2 of the injection molding machine 1, and then through a tensioning device 11 and to a wind-up device 12. The tensioning device 11 is synchronized to act simultaneously with the advancement of the string of molded items due to the upward index of the advancing means 8 of the indexing mechanism 7. The tensioning device 11 takes up the string of parts as advanced and thereby maintains the tension on the entire continuous string 9. The winding device 12 at this time can coil the continuous string of items under the tension provided by the tensioning device 11, or can be designed to wait until some subsequent advancement of the string of items takes place. Importantly, however, the winding operation takes place under tension so that a coil is achieved which thereby substantially precludes sagging and/or entanglement of the molded items during the winding and unwinding of the coil.

The press of the clamping section 2 of the injection molding machine can then close to begin the entire sequence over again. The closing of the press can be actuated by a microswitch which is tripped by the advancing means 8 upon its reaching its uppermost position.

Figure 4:
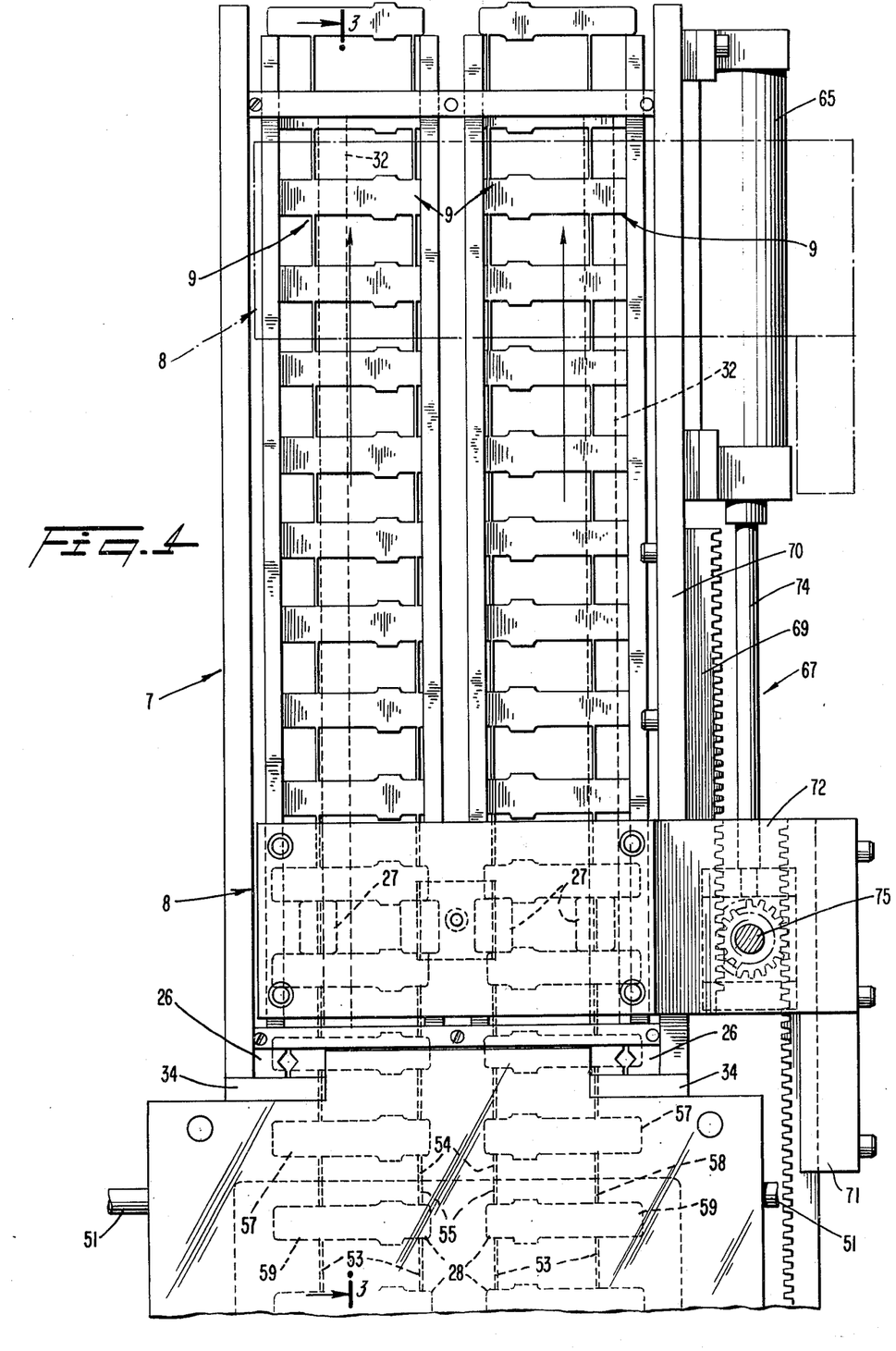
FIG. 4 is a frontal cross-sectional view of the indexing mechanism.

Referring now to FIG. 2, one type of indexing mechanism suitable for the purposes of the present invention will be described in more detail. In FIG. 2, advancing means 8 of the indexing mechanism 7, is at its lowermost position, resting on adjustable stop 24. Two portions or jaws 22, 23 of the advancing means are closed. The continuous string 9 of molded items is therefore securely bound by the advancing means of the indexing mechanism. The string of items 9 can be a single string, or a double string. It is generally preferred to mold a double string of items, (as shown in FIG. 4), in order that a larger volume of articles or elements are manufactured in a shorter period of time. In either case, the particular indexing mechanism employed should be made suitable to handle either the single or double string of items. The term "item", as used to describe that which is molded, can comprise but a single article or element, or a plurality of articles or elements connected via molded connectors, and which plurality of articles or elements may be the same or different.

The press 25 of the injection molding machine is shown closed in FIG. 2, thereby defining the mold cavities 28. Once the molding operation is complete, the press opens and a conventional ejector plate 29 moves forward on bars 30. The movement of the plate 29 forward also moves ejector pins 31 forward, which protrude into the mold cavities to eject the newly molded item from the mold cavities 28.

Connected to the ejector plate is a push block 31, the top portion of which 32 abuts the indexing mechanism 7. Thus, when the plate 29 moves forward, the push block 31 pushes the indexing mechanism forward as well. The indexing mechanism moves on micro slides 26, upon which the indexing mechanism is securely mounted, and which are able to slide along tracks (not shown) in block 34. The block 34 remains stationary and is secured to the clamp portion of the molding machine.

The indexing mechanism is locked into its forward or aft positions by a lock detent 35, which fits into detents 36, 37. The lock detent 35 can comprise a ball bearing biased by a spring, for example, so that it snaps into either detent 36 or 37. When the indexing mechanism is in its aft position, the lock detent 35 is secured in detent 36. Upon pressure being applied by push block 31, the indexing mechanism 7 moves forward to its forward position where the lock detent 35 engages detent 37.

Once the ejector plate 29 returns to its original position, the indexing mechanism 7 remains locked forward by means of its lock detent 35 engagement with detent 37. The advancing means 8, then supports the string of molded items 9.

The advancing means 8 shown in FIG. 2 supports the string of items via a block 27, which is inserted behind a rearwardly facing edge 47 of item 39. The block 27 fits in the spacing between two consecutive molded items or elements thereof 39, 40. This block is on the outer jaws 22 of the advancing means 8. In this manner, the indexing mechanism may support and withdraw the newly molded item from the mold without actually grabbing and thereby distorting any of the molded items. Of course, other means for latching onto the string of items in order to advance same, can be employed if so desired. However, the shown indexing mechanism and manner is that preferred.

The advancing means 8 of the indexing mechanism 7 then indexes to its uppermost position, the position shown in FIG. 3, resulting in the advancement of the entire string of molded items 9. The advancing means 8 can move on bars 32, which are mounted to a top and bottom plate of the indexing mechanism structure.

An adjustable stop 42, which may be mounted on the advancing means or index mechanism structure, can be used to assure the advancing means indexes the proper distance and to fine tune the distance when needed. Upon advancing to the uppermost position, the advancing means can also trip a microswitch 44 which activates the closing of the press to restart the cycle.

Once the press 25 again closes, the indexing mechanism 7 is returned to its aft position. A push block 46 mounted on the press applies pressure to the indexing mechanism upon the closing of the press so that it returns to its aft position where detent stop 35 engages detent 36. The advancing means of the indexing mechanism is then activated to separate its jaws 22, 23 in order to release the string of articles as shown in FIG. 3. In the indexing mechanism of FIG. 3, only one jaw i.e., jaw 22, moves in the opening of the advancing means 8, while the other jaw 23 remains stationary. The opening and closing of the advancing means, i.e., the movement of jaw 22, is controlled by a hydraulic cylinder 43 or some other suitable means. The hydraulic cylinder has a contractable and expandable rod 45 which is connected to the movable jaw 22. The movable jaw 22 may also ride on other stationary rods 47, mounted in stationary jaw 23, for added support. Since the block 27 is mounted on the jaw 22, the continuous string of molded items is released once the jaw 22 is moved to the open position.

As mentioned previously, the advancing means 8 of the indexing mechanism 7 can move on rods 32, with the movement being controlled by a hydraulic cylinder 40 (FIG. 4). Movement along the rods can be via ball bearing guide bushings 49 to which the section 23 is connected, or the movement can be achieved through some other conventional type system.

In FIG. 4 there is depicted a frontal view of the indexing mechanism 7 in relation to the mold cavities 28, where the advancing means 8 is in its lowermost position.

In the molding operation, conduits 51 supply the molten resin injected into the mold cavities 28. The gates for the mold cavities are preferably in the connectors 53 as opposed to the elements, although if desired, the gates may also be in the mold cavities for the elements. It is preferred that two strings of items, with each molded item comprising a plurality of elements, be molded at a time as depicted in FIG. 4, for reasons of high volume. Of course, the process of the present invention can be similarly adapted for the molding of a single string of items, with each molded item comprising a plurality of articles or elements or but a single element or article.

The items molded are molded in spaced relationship to one another and are connected through molded connectors 58. When the item comprises a plurality of elements, these elements are also molded in spaced relationship and connected through molded connectors 53. One or more molded connectors may be used, with two, as shown in FIG. 4, generally being preferred for purposes of stability. It is preferred, however, that the molded connectors be as small as possible in order to limit the amount of scrap moldings that must be dealt with. By employing the particular aforedescribed indexing mechanism, only very small molded connectors need be used for they only play a role of providing a connection from one item or element thereof to the other, and do not fulfill the role of also providing a means by which the continuous string of items are to be latched onto and advanced. The block or blocks 27 of the indexing mechanism are simply inserted behind the rearwardly facing edge 47 of an item or element thereof, thereby fitting in the spaces between two successive items or elements thereof, and does not require a grabbing of the runner or the article itself.

Upon advancing the newly molded item from the mold by the advancing means 8, the item is only advanced to a position such that the trailing ends 54 of the trailing connectors connected to the last molded item extends into the mold cavity. The leading ends 55 of connectors of the next molded item will then be molded to the trailing ends 54. If the items being molded comprise a plurality of elements as shown in FIG. 4, the trailing connectors can be integral with the last element 57 of the previously molded item, which extend into the mold cavity. The leading ends of the connectors of the foremost element 59 of the item to be molded will then be molded to the trailing ends 54. Upon the subsequent molding operation, therefore, the newly molded item, whether of a single element or plurality of elements, is fused and becomes integral to the already existing string of items.

If desired, the last molded item or the last element 57 thereof can fit into a piloting cavity. The use of a piloting cavity would provide greater assurance of having the trailing connectors 54 be properly oriented and in position to extend into the cavities of the leading connectors 55.

It is preferred that the leading ends 55 and trailing ends 54 of the connectors be molded so that a mechanical interlock may also be realized upon a joining of same. This would provide an additional safeguard in the chance that the fusion between the connectors was not complete. The nature of the mechanical interlock can be of any convenient nature, such as a simple complimentary crimp in each of the connectors, a flange type in which one fits into a recess in the other, or that of a mechanical pin. The smaller the molded connectors, however, the less sophisticated the interlock must generally become for practical reasons.

Figures 5, 6, 7:
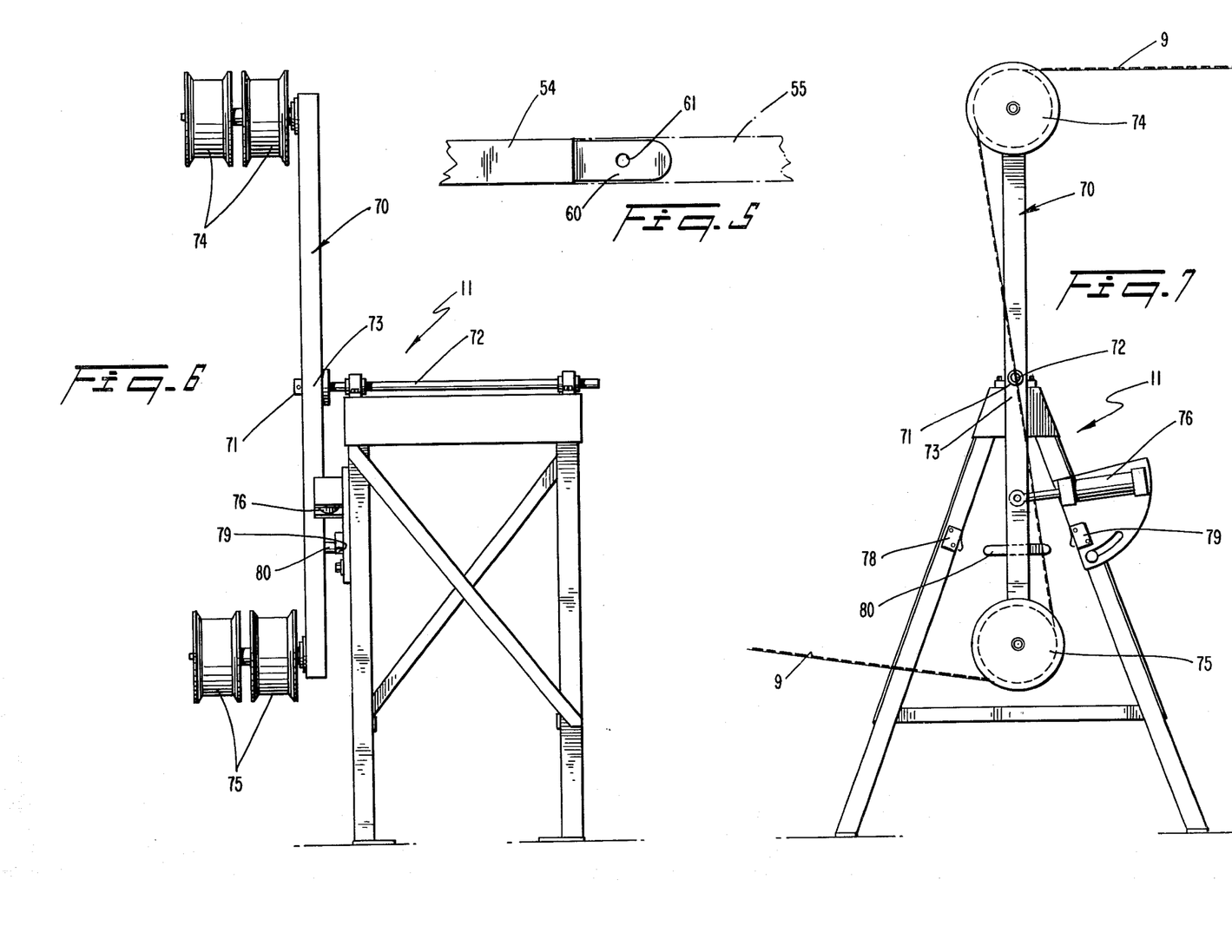
FIG. 5 is a plan view showing the trailing end of a molded connector of a previously molded item and the leading end of a molded connector of a last molded item in a preferred embodiment of the present invention.
FIG. 6 is a view of a tensioning device in a preferred embodiment of the present invention.
FIG. 7 shows a side view of the tensioning device of FIG. 6.

FIG. 5 shows a mechanical interlock where the trailing connector 54 has a diminished end 60 with a hole 61. Thus, when the leading connector 55 is molded, the resin also enters the hole 61 to provide a mechanical pin type of interlock.

Referring again to FIG. 4, once the molding operation has been completed and the newly molded item has been ejected from the mold cavities, the indexing mechanism withdraws the newly molded item from the mold, except for the trailing ends 54. This action results in an advancement of the entire continuous string of molded items 9. The advancing by the advancing means 8 of the indexing mechanism 7 is controlled by the hydraulic cylinder 65, with the advancing means moving along the bars 32. A rack and pinion mechanism 67 for achieving the movement of the advancing means 8 is shown in FIG. 4.

The left rack 69, which is stationary is mounted to the side panel 70 of indexing mechanism 7. The movable rack 71 is mounted to a back panel 72 of the advancing means 8, so that the rack 71 moves up and down with the advancing means. Also secured to the back panel 72 is the rod 74 of the hydraulic cylinder 65. Thus, as the rod contracts and expands, the advancing means 8 and rack 71 move up and down. Pinion 75 is meshed with racks 69 and 71.

The continuous string of items, prior to being wound in a coil, passes through the tensioning device 11 which maintains a constant tension on the string and thereby allows for the string to be wound in a coil under tension to substantially preclude problems caused by a sagging of the coil and entanglement of the items. While any suitable tensioning device may be employed, a preferred tensioning device (FIG. 6) comprises a bar 70, preferably vertical, which is free to rotate around an axis 71 disposed perpendicular to the bar. This may be achieved, for example, by connecting a rotatable rod 72 to the middle of the bar 7. At the top of the vertical bar 70 are mounted pulleys or guides 74 through which the continuous string of items pass. At the bottom of the bar are mounted additional guides 75 through which the continuous string of articles pass onto the winding device. In FIG. 6, two sets of guides 74 and 75 are shown, thereby making the tensioning device appropriate for use for two continuous strings of molded items. Any other suitable means for supporting the vertical bar may be used.

In FIG. 7, it is seen that the continuous string of items passes over the topmost guide 74 and then under the bottom guide 75 in a serpentine or S-wrap manner. The vertical bar 70 is biased by an air cylinder 76 or other suitable means, e.g., a spring, so that the top portion of the bar 70 moves generally in the direction of the advancement of the continuous string of items and the bottom portion moves generally away from the direction of advancement, i.e., the top of the vertical bar moving to the left and the bottom of the vertical bar moving to the right in FIG. 7. Thus, the tensioning means is synchronized with the molding and indexing operations in the sense that whenever the continuous string of articles is advanced by the advancing means, the vertical bar 70 of the tensioning means 11 moves correspondingly to pick up the added length in the string 9 created by the advancement of the items, thereby maintaining a constant tension on the continuous string 9. In other words, the top of the vertical bar would move to the left, in the direction in which it is biased by the air cylinder 76, simultaneously with the advancement of the continuous string of items due to the indexing operation.

If desired, the winding device 12, which is run intermittently and to which the string of articles 9 proceeds, can be activated after every indexing operation to thereby coil the string of items under tension. The winding device need not occur, however, with every advancing or indexing operation, but can occur only after a designated number of indexing operations, e.g., after the 4th, 5th or 6th indexing operation. In such an instance, the tensioning device picks up the added length created by the added items and maintains a constant tension thereon until a winding operation occurs. It is preferred that the winding operation in such instances be activated and deactivated by microswitches or some other type of sensing means which can be tripped by the vertical bar 70 of the tensioning device as it moves.

In FIG. 7, microswitches 78 and 79 depict such actuation means in the operation of such a system. The upper portion of bar 70 moves to the left during every indexing or advancing operation in order to maintain a constant tension on the continuous string of molded items. Of course, as the top of the vertical bar is moving to the left, the bottom is moving to the right. After a predetermined number of advancing operations, the microswitch 79 is tripped, for example, by a stud 80 located on the bar 70. The tripping of the microswitch activates the winding device which begins coiling the string of items under tension. The coiling of the articles causes the tensioning device to return to its original or neutral position whereupon the wood stud 80 trips the microswitch 78 to deactivate the winding device. The cycle is then again repeated with the upper portion of the vertical bar moving in the direction of the advancement of the continuous coil of items in order to maintain a constant tension on the string of items. The movement of the bar continues in the direction of the advancement until the microswitch 79 is again tripped, activating the winding operation. The exact number of advancing or indexing operations taken up by the tensioning device prior to the activation of the winding operation can be predetermined by the distance created between microswitches 78 and 79.

The air cylinder 76 is a preferred biasing means as its bias can be easily regulated and altered as needed. For example, the air pressure of the cylinder can be about 15 p.s.i. when the winding operation is not occurring, and only about 5 p.s.i. when the winding operation is activated. Since the winding operation will generally be activated during an advancing operation due to the difficulty in achieving a predetermined distance between microswitches 78 and 79 which corresponds exactly to a certain number of advancing operations, conflicting forces will be exerted on the string of items by the winding operation and movement of the bottom portion 75 of the bar 70. The lesser bias, i.e., 5 p.s.i., will lessen the strain and hence the possibility of breakage of the string of items. Of course, the molding connectors can be made larger and strong enough to withstand any possible strain, in which instance the bias or tension of the tensioning device 11 need not altered. In such instances, a static bias may be applied.

With regard to the winding operation, it has also been found most desirable that a clutch and brake mechanism be employed. Hence, the motor of the winding device runs continuously, but the clutch or brake is engaged during the activation or deactivation of the winding operation respectively.

Thus, it can be readily seen that the winding, the tensioning, the advancing or indexing and the molding operations are all integrated and synchronized in order allow for a continuous operation of the molding machine while maintaining a constant tension upon the continuous molded string of articles to thereby result in a winding of the string of items under tension. The integration and synchronization of the overall process as described by reference to the drawings exemplifies such a process which allows the molding and winding of a tightly coiled string of items to continue with little supervision, thereby making the process extremely attractive to the molding operators. The only supervision necessary once the process has been initiated is that normally required to check that the molding machine and the rest of the equipment is working properly.

Moreover, once a spool upon which the continuous string of articles is being wound is completely filled, by readying another spool on a carriage on wheels, the fully coiled spool can be readily replaced with an empty spool with very little down time, if any. As well, the system can be operated to achieve several adjacent coils of items on a single spool, if desired.

The tightly wound coil of articles is of considerable value and advantage to the assembler. Due to the winding of the coil under the constant tension, little or no entanglement or sagging of the coil occurs. The need for constant monitoring and the disadvantages of having to constantly shut down the operation due to the sagging of the coil or in order to untangle the coil is thereby avoided. As well, the coil allows the assembler to automatically feed the elements to the assembly machinery instead of having to hand orient and feed individual parts or strips of parts.

The process and apparatus of the present invention, therefore, provide not only a continuous string of molded items in a form which is extremely advantageous for the assembler, but also a method which is extremely advantageous to the molding operator in the efficient, continuous and integrated operation of the system. The advantages of the process and apparatus of the present invention can be realized in applying same to any part or item which can be coiled and which would be eventually fed to an assembly machine on a continuous basis. Particular applicability would be found in molding parts for the electronics, communications, appliance and consumer products industries, where a requirement for small molded parts linked together for automatic assembly exists.

While the present invention has been described in terms of molding elements which will be later assembled to form a final product, it is readily seen that the present invention can be also employed for molding any article per se where a need for a continuous chain or string of said articles in a coiled form exists.

Although the invention has been described with preferred embodiments, it is to be understood that variations and modifications may be resorted to as will become apparent to those skilled in the art. Such variations and modifications are to be considered within the purview and scope of the claims appended hereto.

What is claimed:

1. An apparatus for forming and coiling a continuous string of molded items, the apparatus comprising a mold for molding an item such that the item has an integral trailing connector, advancing means for advancing the string to generally remove such item from the mold cavity while a portion of the trailing connector thereof remains in the cavity so that a subsequently molded item is connected to the trailing connector of a preceding item and is spaced from the preceding item and wherein the advancing means comprises a cam, means for inserting the cam into the space between two successive items, and means for moving the cam in the direction of advancement so that the cam pushes against one of the items and advances the string, the advancing means comprising two movable jaws which are movable together in the vertical direction and to one of which the cam is attached, and with at least one jaw being movable relative to the other jaw in the horizontal direction to thereby confine items therebetween upon inserting the cam in the space between two successive items, tensioning means for imposing a constant tension on the string, the tensioning means including at least one movable guide for the string, a first and second sensing means between which the guide moves, with the first sensing means activating a winder and the second sensing means deactivating the winder, and a bar with a guide at each end, said bar being rotatable about an axis disposed perpendicular to the bar and being resiliently biased so that the guide first contacted by the string is urged generally toward the direction of advancement of the string and the guide subsequently contacted by the string is urged generally away from the direction of advancement, and coiling means for periodically winding the string into coil form while a constant tension is imposed thereon.

* * * * *